(12) United States Patent
Hebrank

(10) Patent No.: US 8,292,340 B2
(45) Date of Patent: Oct. 23, 2012

(54) METHOD AND APPARATUS FOR MONITORING THE PERFORMANCE OF AUTOMATED EGG REMOVAL

(75) Inventor: John H. Hebrank, Durham, NC (US)

(73) Assignee: Pfizer Inc., New York, NY (US)

( * ) Notice: Subject to any disclaimer, the term of this patent is extended or adjusted under 35 U.S.C. 154(b) by 986 days.

(21) Appl. No.: 12/235,316

(22) Filed: Sep. 22, 2008

(65) Prior Publication Data

US 2009/0314691 A1    Dec. 24, 2009

Related U.S. Application Data

(63) Continuation-in-part of application No. 11/859,285, filed on Sep. 21, 2007.

(51) Int. Cl.
*B65G 59/04* (2006.01)
(52) U.S. Cl. .................................... 294/87.12
(58) Field of Classification Search ............... 294/183, 294/184, 185, 87.12; 414/403, 404, 737, 414/752.1; 209/644; 351/52, 53
See application file for complete search history.

(56) References Cited

U.S. PATENT DOCUMENTS

| | | | |
|---|---|---|---|
| 4,458,630 A | 7/1984 | Sharma et al. | |
| 4,681,063 A * | 7/1987 | Hebrank | 119/6.8 |
| 4,805,778 A | 2/1989 | Nambu | |
| 5,028,421 A | 7/1991 | Fredericksen et al. | |
| 6,149,375 A | 11/2000 | Hebrank | |
| 6,224,316 B1 | 5/2001 | Hebrank et al. | |
| 6,477,442 B1 | 11/2002 | Valerino, Sr. | |
| 6,805,244 B1 | 10/2004 | Toelken | |
| 7,096,820 B2 | 8/2006 | Correa et al. | |
| 2006/0156989 A1 | 7/2006 | Hebrank | |
| 2007/0024844 A1 | 2/2007 | Hebrank et al. | |

OTHER PUBLICATIONS

PCT International Search Report, dated Mar. 26, 2009; International Publication/Application No. WO2009/039520 A1 / PCT/US2008/077274.
PCT Written Opinion, dated Apr. 1, 2010; International Application No. PCT/US2008/077274.

* cited by examiner

*Primary Examiner* — Paul T Chin
(74) *Attorney, Agent, or Firm* — Barbara L. Renda; Scott C. Mayhew

(57) ABSTRACT

Methods and apparatus are provided that automatically determine whether or not eggs designated for removal from an egg carrier have been removed by an egg removal apparatus. Light is emitted along a path above and across an egg carrier as an egg picker moves to pick up an egg. The length of time that the light path is blocked when the egg picker is moved is measured and used to determine whether or not the egg has been removed from the carrier. Another apparatus and method is provided for detecting a malfunctioning egg picker. A detection device detects a number of eggs in the egg carrier. A control device monitors the egg picker and the detection device. The control device calculates the number of eggs in the egg carrier for determining when the number of eggs varies a predetermined amount from an egg count number for the egg carrier.

12 Claims, 12 Drawing Sheets

METHOD AND APPARATUS FOR MONITORING THE PERFORMANCE OF AUTOMATED EGG REMOVAL

CROSS REFERENCE TO RELATED APPLICATION

This application is a continuation-in-part of U.S. patent application Ser. No. 11/859,285 filed on Sep. 21, 2007, the entire contents and disclosure of which is expressly incorporated by reference in its entirety.

FIELD OF THE INVENTION

The present invention relates generally to an egg handling apparatus and, more particularly, to apparatus and methods for monitoring egg handling.

BACKGROUND OF THE INVENTION

Eggs which are to be hatched to live poultry are typically candled during embryonic development to identify clear, rotted, and dead eggs (collectively referred to as "non-live eggs"). Non-live eggs are typically removed from incubation to increase available incubator space. In addition, removing non-live eggs can increase hatch rates by as much as 2.0% in old flocks (flock age: 58-62 weeks). This hatch improvement can have a direct value increase of about 0.2 to 0.4¢ per chick in the United States.

In many instances it is desirable to introduce a substance into a live egg prior to hatch. Advances in poultry embryology have made possible the addition of various materials to the embryo or to the environment around the embryo within an avian egg for the purpose of encouraging beneficial effects in the subsequently hatched chick. Such beneficial effects include increased growth, prevention of disease, increasing the percentage hatch of multiple incubated eggs, and otherwise improving physical characteristics of hatched poultry. Additionally, certain types of vaccinations which could previously only be carried out upon either recently hatched or fully mature poultry can now be successful in the embryonated chick. Examples of substances that have been used for, or proposed for, in ovo injection include vaccines, antibiotics and vitamins. In ovo treatment substances and methods of in ovo injection are described, for example, in U.S. Pat. No. 4,458,630 to Sharma et al. and U.S. Pat. No. 5,028,421 to Fredericksen et al.

Unfortunately, it may not be desirable to administer vaccinations into every egg contained within an egg flat. For example, clear eggs are eggs that do not contain an embryo and, thus, may not subsequently hatch as a chick. Clear eggs are conventionally removed prior to in ovo injection because the administration of vaccinations into clear eggs generally serves no purpose and may be considered wasteful. In addition, mold may grow in clear eggs that have been injected, thus increasing the risk of exposing other eggs and hatched chicks to undesirable contamination. Furthermore, injected clear eggs may increase the risk of contamination resulting from albumin leaking therefrom. Dead eggs and rotted eggs are also conventionally removed prior to in ovo injection. Accordingly, it is desirable to quickly identify and remove non-live eggs from an egg flat prior to the in ovo administration of vaccinations via automatic inoculating devices.

In the manufacture of human flu vaccines, seed viruses are inoculated into live eggs and then three days later virus material is harvested in batches of eggs. Dead or rotted eggs can contaminate batches of virus harvested from live eggs so that reliable removal of detected non-live eggs is important to minimize contamination and bioburden in harvests. Removal system malfunctions are likely since eggs have holes where they were inoculated and egg goo pulled from the punch hole tends to plug vacuum lines of removal apparatus. In this application small numbers of eggs are typically removed, perhaps 2% to 5%, and human access to harvesting operations for some types of flu vaccines are highly restricted so that a reliable removal is valuable for both economic and health reasons.

It may also be desirable to selectively remove other types of eggs from an egg flat. For example, it may be desirable to remove all male eggs, all female eggs, etc. As another example, it may be desirable to remove all live eggs in order to move them to another egg flat or injection apparatus.

Conventional egg handling devices remove eggs from egg flats by pulling the eggs with a vacuum cup of a suction device. The vacuum cup generally lifts the eggs vertically from a flat and carries them to a disposal location. A conventional device 10 for removing eggs 12 from an egg flat 14 is illustrated in FIG. 1. A plurality of "egg pickers" 16 are configured to engage the upwardly facing portions of a respective plurality of individual eggs 12 within the flat 14, and hold the eggs by suction while carrying them to a receptacle 18.

Sometimes eggs to be removed from a flat cannot be removed by an egg removal device. For example, an egg may be tightly wedged in the pocket of a flat. In addition, spilled egg contents and other foreign matter may act as an adhesive that binds an egg within a pocket of a flat. Conventional suction devices may fail to remove an egg from a flat for other reasons, as well. For example, the vacuum cup of a suction device may fail to seat adequately on an egg, or vacuum leaks may occur because of a feather or other debris on the egg shell, or because of a crack in the egg shell. In addition, a suction device may not be able to remove an egg when there is insufficient vacuum, which may have various causes, such as a torn vacuum cup, clogged venturi or vacuum line, etc. Unfortunately, conventional egg removal systems do not have a way of detecting when an egg that should be removed from a flat is not removed.

SUMMARY OF THE INVENTION

In view of the above discussion, methods and apparatus are provided for automatically determining whether or not eggs designated for removal from an egg carrier have been removed. According to some embodiments of the present invention, a method of removing an egg from an egg carrier includes emitting light along a path above and across an egg carrier; moving an egg picker (and/or an assembly supporting the egg picker) from a first location to a second location in contacting relationship with an egg in the carrier and back to the first location, wherein the egg picker is configured to engage the egg when in the second location and remove the egg from the carrier when moved from the second location to the first location; measuring a length of time that the light path is blocked when the egg picker is moved from the first location to the second location and back towards the first location; and generating a signal that indicates whether or not the egg has been removed from the carrier based on the length of time the light path is blocked, thereby identifying that the egg picker is not operating properly.

In some embodiments, a signal is generated that indicates that an egg has not been removed from the carrier when the measured length of time that the light path is blocked is less than a predetermined length of time. A signal may be generated that indicates that an egg has been removed from the carrier when the measured length of time that the light path is blocked is greater than a predetermined length of time. In some embodiments, an alarm is activated in response to generating a signal that indicates that the egg has not been removed from the carrier.

According to other embodiments of the present invention, a method of removing an egg from an egg carrier includes monitoring an optical path above and across an egg carrier; moving an egg picker (and/or an assembly supporting the egg picker) from a first location to a second location in contacting relationship with an egg in the carrier and back towards the first location, wherein the egg picker is configured to engage the egg when in the second location and remove the egg from the carrier when moved from the second location towards the first location; measuring a length of time that the optical path is blocked when the egg picker is moved from the first location to the second location and back towards the first location; and generating a signal that indicates whether or not the egg has been removed from the carrier based on the length of time the optical path is blocked, thereby identifying that the egg picker is not operating properly.

In some embodiments, a signal is generated that indicates that an egg has not been removed from the carrier when the measured length of time that the optical path is blocked is less than a predetermined length of time. A signal may be generated that indicates that an egg has been removed from the carrier when the measured length of time that the optical path is blocked is greater than a predetermined length of time. In some embodiments, an alarm is activated in response to generating a signal that indicates that the egg has not been removed from the carrier.

According to other embodiments of the present invention, an apparatus for removing eggs from an egg carrier includes an egg picker that is movable between a first location and a second location in contacting relationship with an egg in the carrier, a light source positioned on one side of the carrier that emits light along a path above and across the carrier, and a light detector positioned on an opposite side of the carrier. The egg picker is configured to engage the egg when in the second location and to remove the egg from the carrier when moved from the second location to the first location. The light detector is configured to measure a length of time that the light path is blocked when the egg picker is moved from the first location to the second location and back towards the first location. The light detector generates a signal that indicates whether or not the egg has been removed from the carrier based on the length of time the light path is blocked, thereby identifying that the egg picker is not operating properly.

In some embodiments, a signal is generated by the light detector that indicates that an egg has not been removed from the carrier when the measured length of time that the light path is blocked is less than a predetermined length of time. A signal may be generated by the light detector that indicates that an egg has been removed from the carrier when the measured length of time that the light path is blocked is greater than a predetermined length of time. In some embodiments, an alarm is activated in response to a signal indicating that the egg has not been removed from the carrier.

According to other embodiments of the present invention, an apparatus for removing eggs from an egg carrier includes an egg picker that is movable between a first location overlying a carrier and a second location in contacting relationship with an egg in the carrier, and a camera positioned on one side of the carrier that captures an optical path above and across the carrier. The egg picker is configured to engage the egg when in the second location and to remove the egg from the carrier when moved from the second location towards the first location. The camera is configured to measure a length of time that the optical path is blocked when the egg picker is moved from the first location to the second location and back to the first location. The camera generates a signal that indicates whether or not the egg has been removed from the carrier based on the length of time the optical path is blocked.

In some embodiments, a signal is generated by the camera that indicates that an egg has not been removed from the carrier when the measured length of time that the optical path is blocked is less than a predetermined length of time. A signal may be generated by the camera that indicates that an egg has been removed from the carrier when the measured length of time that the optical path is blocked is greater than a predetermined length of time. In some embodiments, an alarm is activated in response to a signal indicating that the egg has not been removed from the carrier.

According to other embodiments of the present invention, an apparatus for removing eggs from an egg carrier includes an egg picker that is movable between a first location overlying a carrier and a second location in contacting relationship with an egg in the carrier, and a detector positioned adjacent to the carrier. The detector is configured to monitor a path above and across the carrier and to measure a length of time that the path is blocked when the egg picker is moved from the first location to the second location and back to the first location. The detector is configured to generate a signal that indicates whether or not an egg has been removed from the carrier based on the length of time the path is blocked. For example, the detector may generate a signal that indicates that an egg has not been removed from the carrier when the measured length of time that the path is blocked is less than a predetermined length of time. The detector may be configured to generate a signal that indicates that an egg has been removed from the carrier when the measured length of time that the path is blocked is greater than a predetermined length of time.

According to some embodiments of the present invention, a method of detecting a malfunctioning egg picker in an apparatus for removing eggs from an egg carrier, includes counting the number of times an egg picker fails to remove an egg designated for removal from the carrier, and generating a signal that indicates that the egg picker is malfunctioning when the number of times exceeds a predetermined number and/or a predetermined percentage.

According to some embodiments of the present invention, a method of detecting a malfunctioning egg picker in an apparatus for removing eggs from an egg carrier, includes determining the specific picker in a row that failed to remove an egg by combining the information that an egg was not picked from a row with the specific picker in the row activated to pick an egg and counting the number of times an egg picker fails to remove an egg designated for removal from the carrier, and generating a signal that indicates that the egg picker is malfunctioning when the number of times exceeds a predetermined number and/or a predetermined percentage.

According to some embodiments of the present invention, a method of detecting a malfunctioning egg picker in an apparatus for removing eggs from an egg carrier includes counting, via an optical system positioned adjacent to the carrier, the number of times any of the egg pickers in the apparatus fails to remove an egg designated for removal from the carrier, and generating a signal that indicates that an egg picker is malfunctioning when the number of times exceeds a predetermined number. The optical system may include, for example, a camera positioned above or below the carrier.

In another aspect of the invention, an apparatus for detecting a malfunctioning egg picker includes an egg picker movable between a first location and a second location in contacting relationship with an egg in an egg carrier. The egg picker is configured to engage a specified egg when in the second location and to remove the specified egg from the carrier when moved from the second location towards the first location. A detection device for detecting a number of eggs in the egg carrier when the egg carrier is in a specified location is adjacent the egg picker. A control device electrically communicates with and monitors the egg picker and the detection device. The control device receives data from the detection device for calculating the number of eggs in the egg carrier, and the control device determines when the number of eggs in the egg carrier varies a predetermined amount from a predetermined egg count number for the egg carrier.

In a related aspect, the control device generates a signal indicating when the number of eggs in the egg carrier varies the predetermined amount from the egg count number. The apparatus may further include an alarm communicating with the control device and being activated by the generation of the signal. The control device may correlate the egg carrier to at least one egg picker when the number of eggs in the egg carrier varies the predetermined amount from the egg count number, and the signal identifies the egg picker. Further, the signal may indicate the correlated egg picker is malfunctioning. Additionally, the number of eggs in each row or column of the egg carrier is used to determine when the number of eggs in the egg carrier varies the predetermined amount from the predetermined egg count number for the egg carrier. Further, a number of eggs missing from the egg carrier before the egg picker engages the specified egg, may be used to determine the predetermined egg count number. The detection device may be positioned above the egg carrier, and the detection device may include an optical system for determining the number of eggs in the egg carrier. The optical system may include reflective photodetectors. The apparatus may further include a moveable conveyor system transporting a plurality of egg carriers to the specified location adjacent the egg picker after removal of specified eggs by the egg picker. The detection device may detect the number of eggs in a row in the egg carrier as the egg carrier moves past the detection device at a predetermined rate of speed. The control device may calculate a position in the egg carrier for each egg and each empty location in the egg carrier detected by the detection device. The control device may generate the signal when an egg picker has missed at least two eggs.

In another aspect of the invention, a method of detecting a malfunctioning egg picker includes the steps of: moving an egg picker between a first location and a second location in contacting relationship with an egg in an egg carrier, the egg picker being configured to engage a specified egg when in the second location and to remove the specified egg from the carrier when moved from the second location towards the first location; detecting a number of eggs in the egg carrier using a detection device; comparing the number of eggs in the egg carrier with a predetermined egg count number for the egg carrier using a control device electrically communicating with the egg picker and the detection device; and determining when the number of eggs in the egg carrier varies a predetermined amount from the egg count number using the control device.

In a related aspect, the method further comprises generating a signal using the control device indicating when the number of eggs in the egg carrier varies the predetermined amount from the egg count number. In a further related aspect, the method further comprises correlating the egg carrier to at least one of a plurality of egg pickers using the control device when the number of eggs in the egg carrier varies the predetermined amount from the egg count number, and the signal indicating at least one correlated egg picker is malfunctioning. The method may further comprise the steps of: positioning the detection device above the egg carrier, and the detection device having an optical system; and determining the number of eggs in the egg carrier using the optical system. The method may further include the steps of: positioning the detection device above the egg carrier, and the detection device including an optical system including photodetectors; and sensing the number of eggs in the egg carrier using the photodetectors. Also, the method may include moving a plurality of egg carriers past the detection device at a specified rate of speed. The may further include calculating a position in the egg carrier for each egg and each empty location in the egg carrier detected by the detection device using the control device. The control device may generate the signal when an egg picker has missed at least two eggs.

In another aspect of the invention, a system for detects a malfunctioning egg picker. The egg picker is movable between a first location and a second location in contacting relationship with an egg in an egg carrier. The egg picker is configured to engage a specified egg when in the second location and to remove the specified egg from the carrier when moved from the second location towards the first location. A detection device for detecting a number of eggs in the egg carrier when the egg carrier is in a specified location adjacent the egg picker. A control device electrically communicates with and monitors the egg picker and the detection device. The control device receives data from the detection device for calculating the number of eggs in the egg carrier. The control device determines when the number of eggs in the egg carrier varies a predetermined amount from a predetermined egg count number for the egg carrier. The control device generates a signal indicating when the number of eggs in the egg carrier varies the predetermined amount from the egg count number. The control device correlates the egg carrier to at least one egg picker when the number of eggs in the egg carrier varies the predetermined amount from the egg count number, and the signal identifies the egg picker. A moveable conveyor system transports egg carriers to the specified location adjacent the egg picker after removal of specified eggs by the egg picker.

In a related aspect, the system farther comprises an alarm communicating with the control device and being activated by the generation of the signal. The detection device may detect the number of eggs in a row in the egg carrier as the egg carrier moves past the detection device at a predetermined rate of speed. The control device calculates a position in the egg carrier for each egg and each empty location in the egg carrier detected by the detection device. The control device may also generate the signal when an egg picker has missed at least two eggs.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
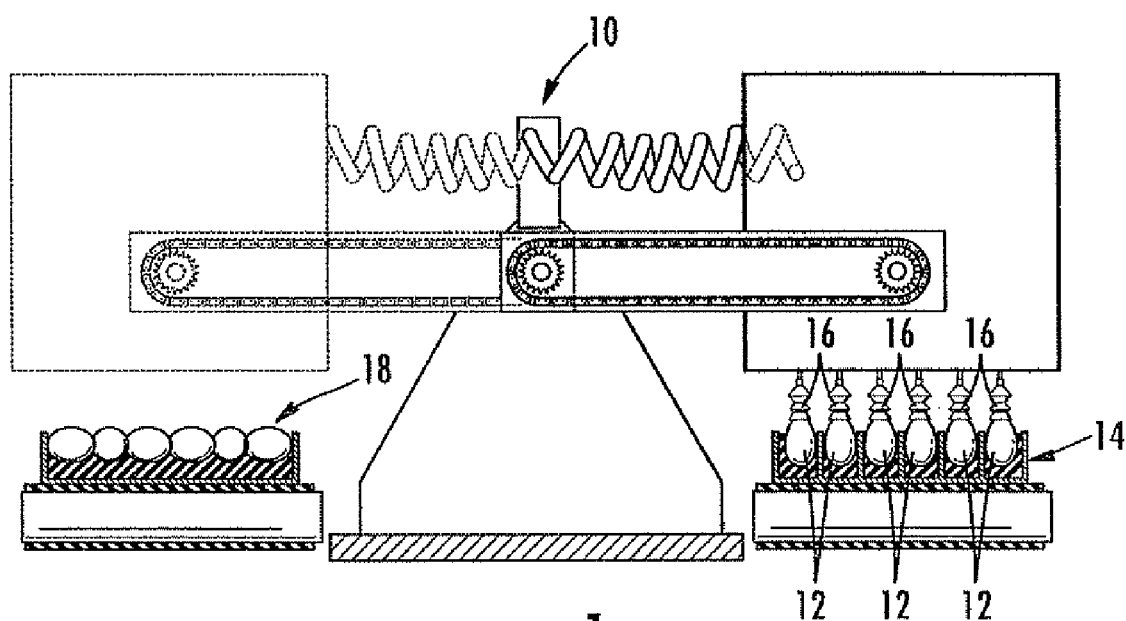
FIG. 1 illustrates a conventional device for removing eggs from an egg flat.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

As would be understood by one skilled in the art, eggs are incubated and processed within a carrier, such as an egg flat. Flats may contain any number of rows, such as seven rows of eggs, with rows of six and seven being most common. Moreover, eggs in adjacent rows may be parallel to one another, as in a "rectangular" flat, or may be in a staggered relationship, as in an "offset" flat. Examples of suitable commercial flats include, but are not limited to, the "CHICKMASTER 54" flat, the "JAMESWAY 42" flat and the "JAMESWAY 84" flat (in each case, the number indicates the number of eggs carried by the flat). Egg flats are well known to those of skill in the art and need not be described further herein.

The term "egg picker" refers to any type of device capable of removing an egg from the pocket of an egg carrier, such as an egg flat.

Figure 2A:
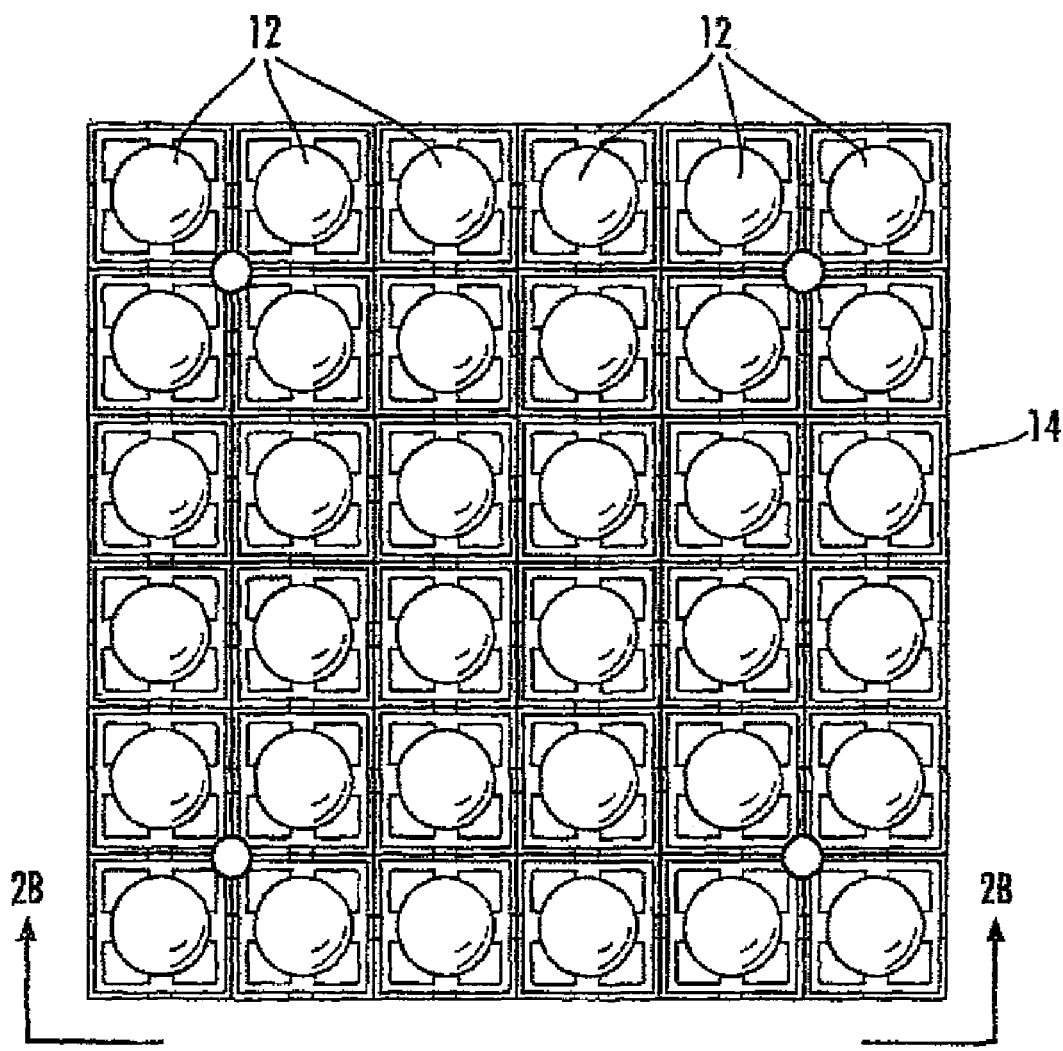
FIG. 2A is a top plan view of an egg flat containing eggs therein.
Figure 2B:
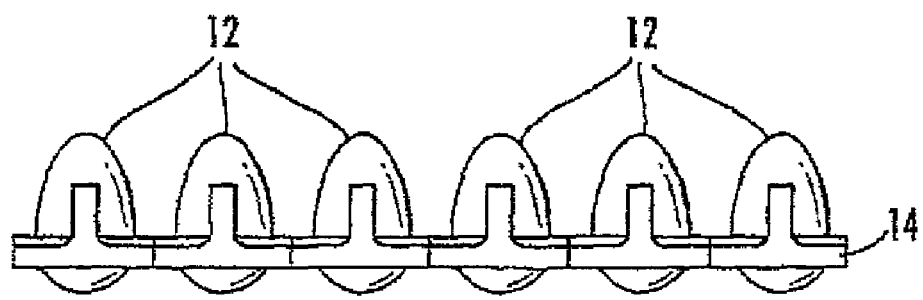
FIG. 2B is a side view of the egg flat of FIG. 2A taken along lines 2B-2B.

The terms "flat" and "carrier" are intended to be used interchangeably herein. Moreover, embodiments of the present invention may be utilized with any type of device configured to transport a plurality of eggs. The term "egg carrier" is intended to include all such devices. FIG. 2A is a plan view of an exemplary egg carrier 14 containing an array of eggs 12 therein that is used to illustrate various embodiments of the present invention. FIG. 2B is a side view of the egg carrier 14 of FIG. 2A taken along lines 2B-2B.

Figure 3A:
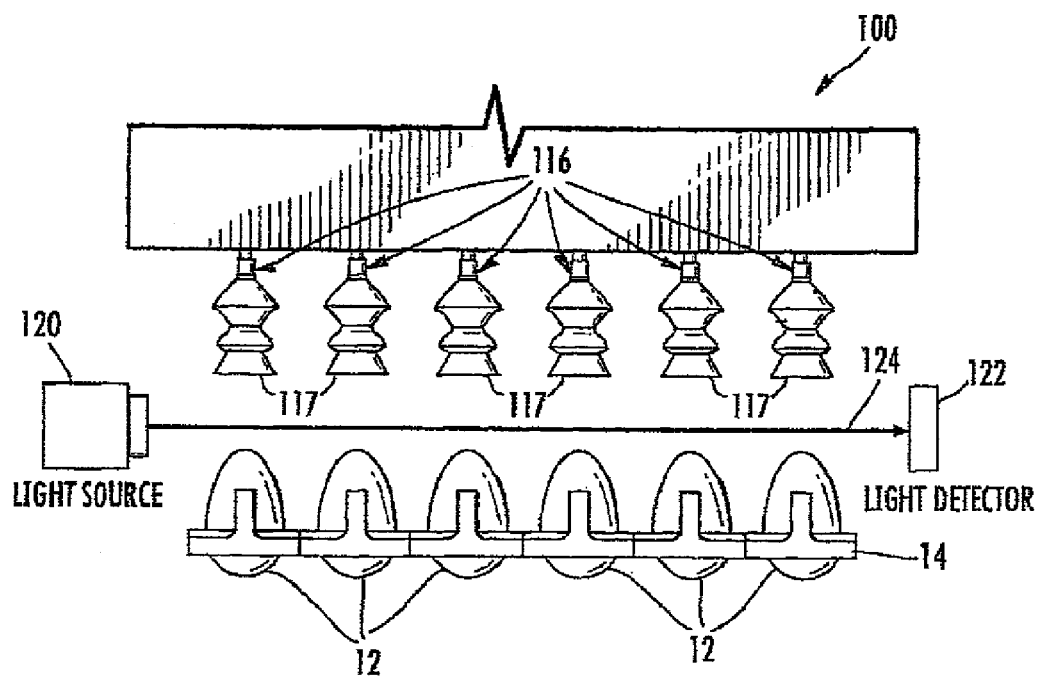
FIGS. 3A-3C and 4A-4C illustrate methods and apparatus for determining if eggs designated for removal from an egg flat have been removed, according to some embodiments of the present invention.
Figure 3B:
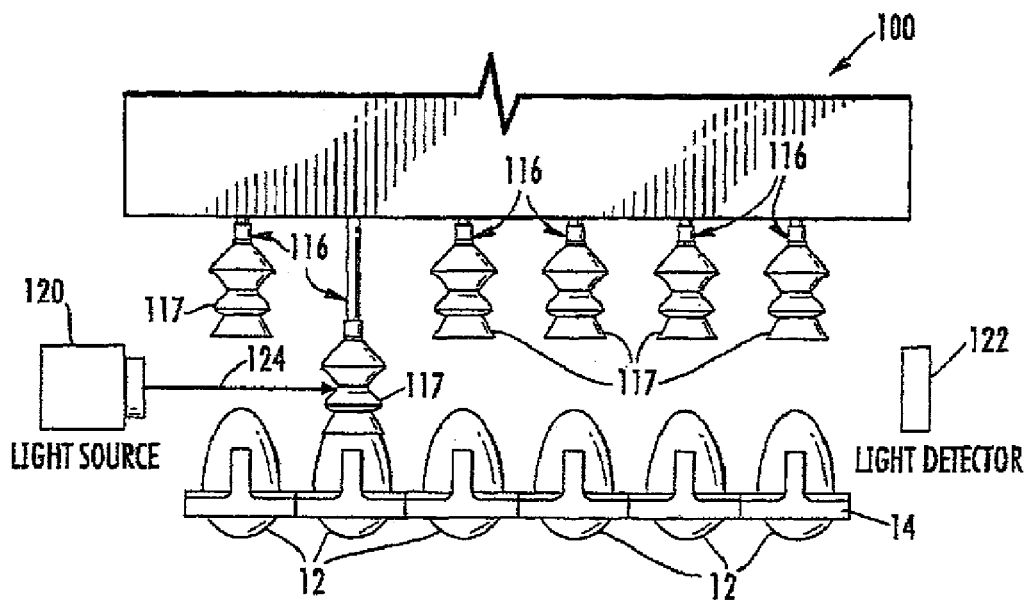

FIGS. 3A-3C and 4A-4C illustrate methods and apparatus for determining if eggs designated for removal have, in fact, been removed from an egg carrier, according to some embodiments of the present invention. In FIG. 3A, the illustrated egg removal apparatus 100 includes a plurality of egg pickers 116 for each row of an egg carrier 14. The egg pickers 116 are movable between a first location (FIG. 3A) and a second location in contacting relationship with a respective plurality of eggs in a carrier 14 (FIG. 3B). In the illustrated embodiment, the egg pickers 116 are individually movable between respective first (i.e., raised) and second (i.e., lowered) locations. However, embodiments of the present invention may be utilized with egg removal devices wherein egg pickers do not move individually, i.e., where a plurality or all of the egg pickers move in concert between first and second locations to remove eggs, for example where egg pickers move via movement of the egg removal apparatus 100. In other embodiments, egg picker 116 movement may be achieved via a combination of individual egg picker movement and egg removal apparatus 100 movement. In other words, egg picker 116 movement discussed herein with the various embodiments may be individual egg picker movement, movement of the egg removal apparatus 100 or a combination of egg removal apparatus 100 movement and individual egg picker 116 movement.

Movement of an egg picker 116 as discussed herein with respect to the various embodiments is not limited to substantially vertical movement relative to an egg carrier 14. An egg picker first location may be a location that is lateral to an egg carrier. In other words, an egg carrier may move from a location adjacent an egg carrier 14, engage an egg, and then move back to a location that is lateral to the egg carrier 14 to drop the removed egg. Egg picker movement, thus, is not limited to the illustrated movement in the figures.

Each illustrated egg picker 116 is configured to engage a respective egg 12 when in the second location and to remove the egg 12 from the carrier 14 when moved from the second location towards the first location. The illustrated egg pickers 116 each have a flexible cup 117 that is configured to engage and retain an egg in seated relation therewith when subatmospheric pressure is provided within the flexible cup 117, as would be understood by those skilled in the art of egg removal devices.

Figure 7:
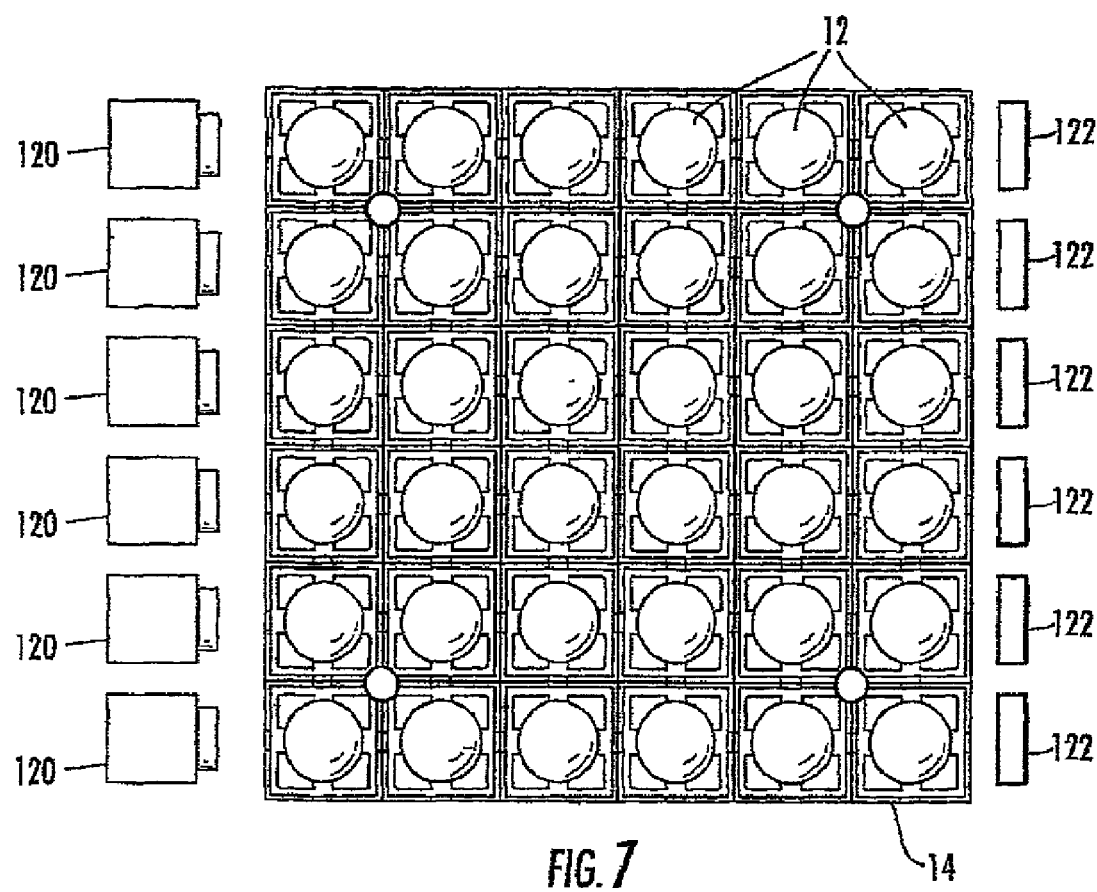
FIG. 7 is a top plan view of an egg flat with a plurality of light sources positioned on one side thereof and a plurality of light detectors positioned on an opposite side thereof, in accordance with some embodiments of the present invention.

A light source/light detector pair 120, 122 is provided for each row of the carrier 14 (see FIG. 7). The light sources 120 are positioned on one side of the carrier 14, as illustrated. Each light source 120 emits light along a path above and across a respective row of the carrier 14. The light detectors 122 are positioned on an opposite side of the carrier 14. Each light detector 122 is configured to measure a length of time that a respective light path is blocked when an egg picker 116 associated with a respective row is moved from the first location to the second location and back towards the first location.

Figure 3C:
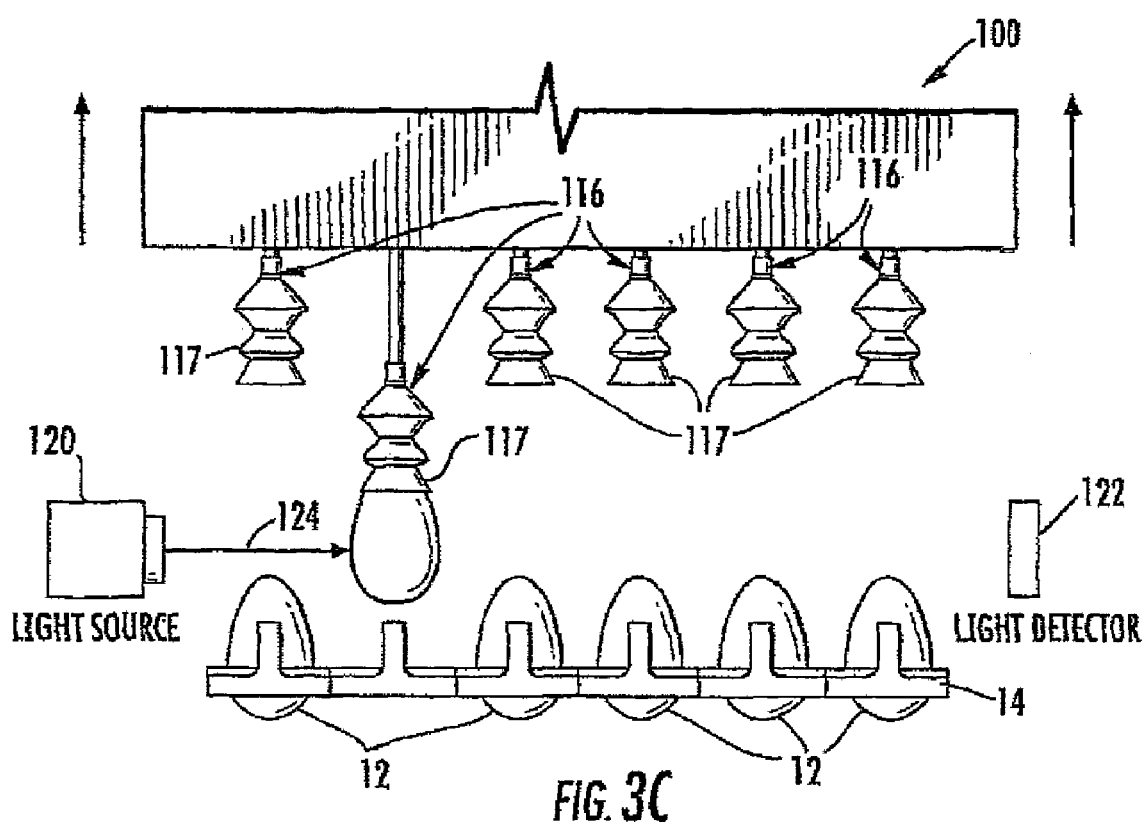

For example, in FIG. 3A, the light source 120 emits light along path 124 that is detected by light detector 122. The light path is not blocked by any of the egg pickers 116 or eggs 12 because none of the egg pickers have moved downwardly towards the second location to remove an egg. In FIG. 3B, the second egg picker 116 is lowered to remove the second egg in the row (which has been designated for removal) and the flexible cup 117 of the egg picker 116 blocks the light path. The egg is engaged by the egg picker 116 when the egg picker 116 reaches the second location and then moves upwardly to the first location, so that the removed egg can be disposed of. As illustrated in FIG. 3C, the egg removed by the egg picker 116 blocks the light path when the egg picker 116 is at the second location. As such, when an egg is successfully removed from the egg carrier 14, a light path 124 will be blocked as the egg picker 116 moves downwardly to the second location and then back to the first location.

Figure 4A:
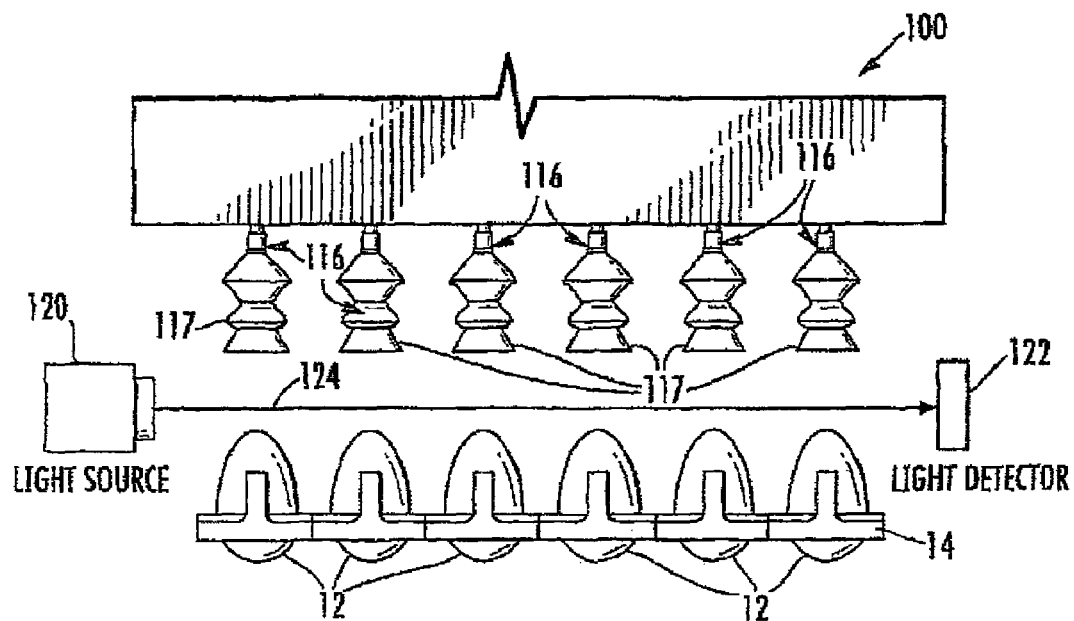
Figure 4B:
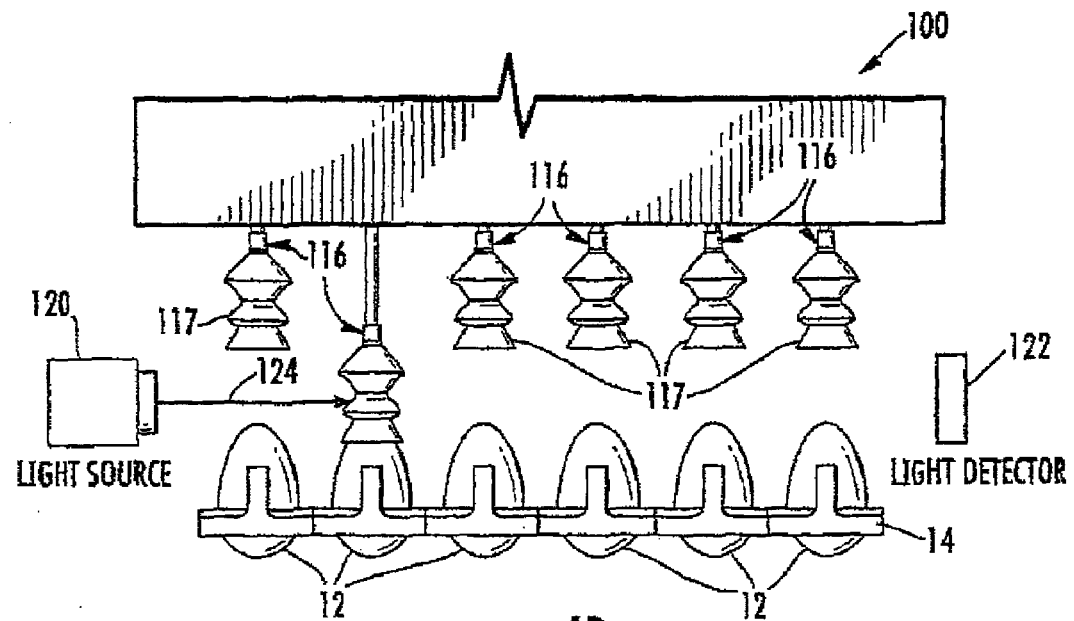
Figure 4C:
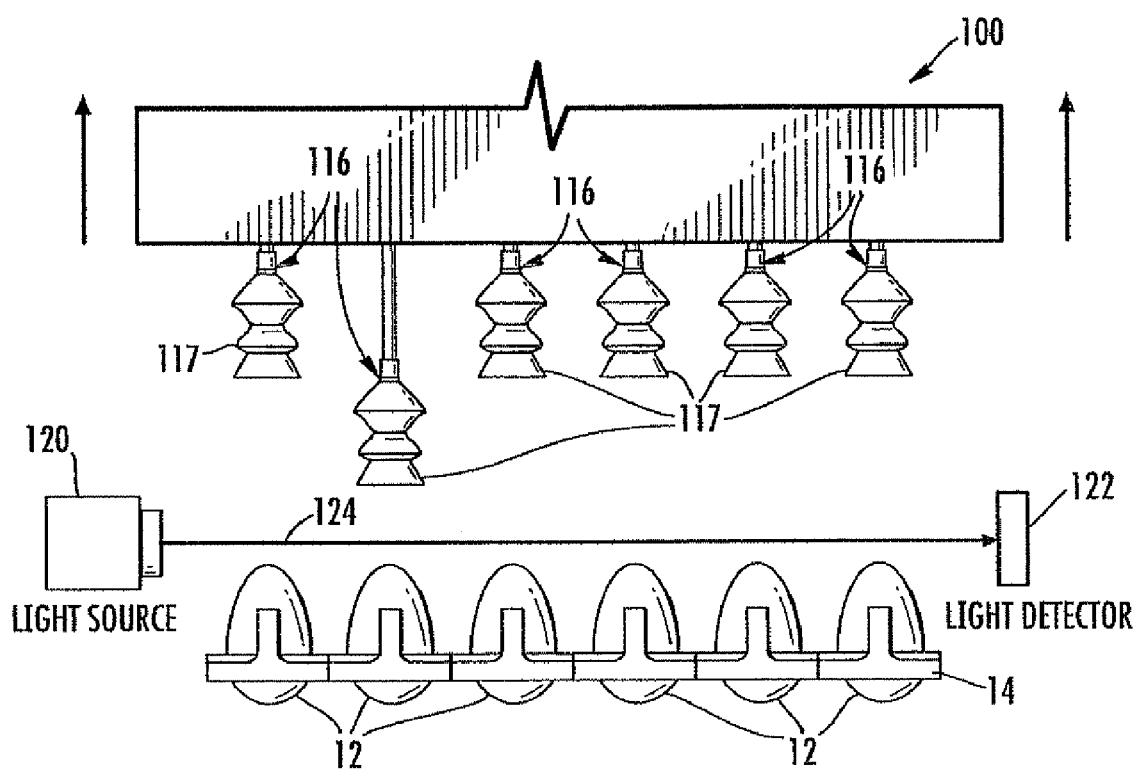

If an egg is not engaged by an egg picker 116 (i.e., an egg picker fails to remove an egg from a carrier), the light path 124 would become unblocked as the egg picker flexible cup 117 moved upwardly past the light path to the second location, as illustrated in FIG. 4C. In FIGS. 4A-4C, the sequence of unsuccessfully removing an egg from the carrier 14 is illustrated. As illustrated, when an egg designated for removal is not successfully removed from the egg carrier, the light path is blocked for a shorter period of time than when an egg is successfully removed. Thus, the light detector 122 for each row of a carrier 14 can quickly determine if eggs designated for removal have, in fact, been removed based on whether the measured length of time that the light path is blocked is less than a predetermined length of time. This predetermined period of time can be set by lowering and raising one or more of the egg pickers 116 without the presence of egg in a carrier, such as during initialization of an egg removal device.

According to some embodiments of the present invention, each light detector 122 is configured to generate a signal that indicates whether or not eggs designated for removal in a row have in fact been removed based on the length of time a respective light path 124 is blocked. For example, each light detector 122 can generate a signal that indicates that eggs in a respective row designated for removal have been removed from a carrier 14 when the measured length of time that the light path is blocked is greater than a predetermined length of time. Similarly, each light detector 122 can generate a signal that indicates that one or more eggs designated for removal in a respective row have not been removed from a carrier 14 when the measured length of time that the light path is blocked is less than a predetermined length of time.

Signals generated by a light detector 122 may be communicated to a controller for the egg removal apparatus 100. The controller may direct the egg removal apparatus 100 to try again to remove the egg. Alternatively, the controller may signal an operator that an egg was unsuccessfully removed, etc. According to some embodiments of the present invention, when an egg has been detected as not having been successfully removed from the carrier, a light detector 122 can communicate a signal to an alarm that becomes activated so as to notify an operator of the unsuccessful removal. Exemplary alarms include audible alarms, visible alarms, alarms on a user interface associated with the egg removal apparatus 100, etc. For example, according to some embodiments of the present invention, the egg removal apparatus 100 may include a user interface that displays a graphical representation of an egg carrier, including each egg pocket therein. The user interface, as a result of communications from the various light detectors 122 can indicate which rows and/or egg pockets in the carrier 14 contain an egg that was unsuccessfully removed therefrom.

Embodiments of the present invention are not limited to the illustrated arrangement of light source/detector pairs 120, 122. According to other embodiments of the present invention, another set of light source/detector pairs may also be utilized along the rows that are oriented orthogonal to the rows of FIG. 7 having light source/detector pairs positioned adjacent thereto. In addition, embodiments of the present invention are not limited to the illustrated egg pickers 116. Embodiments of the present invention may be utilized with any type of apparatus configured to remove eggs from a carrier. In some embodiments, a camera may be positioned above an egg carrier (e.g., substantially orthogonal thereto, etc.) to confirm that eggs designated for removal have, in fact, been removed.

Figure 5:
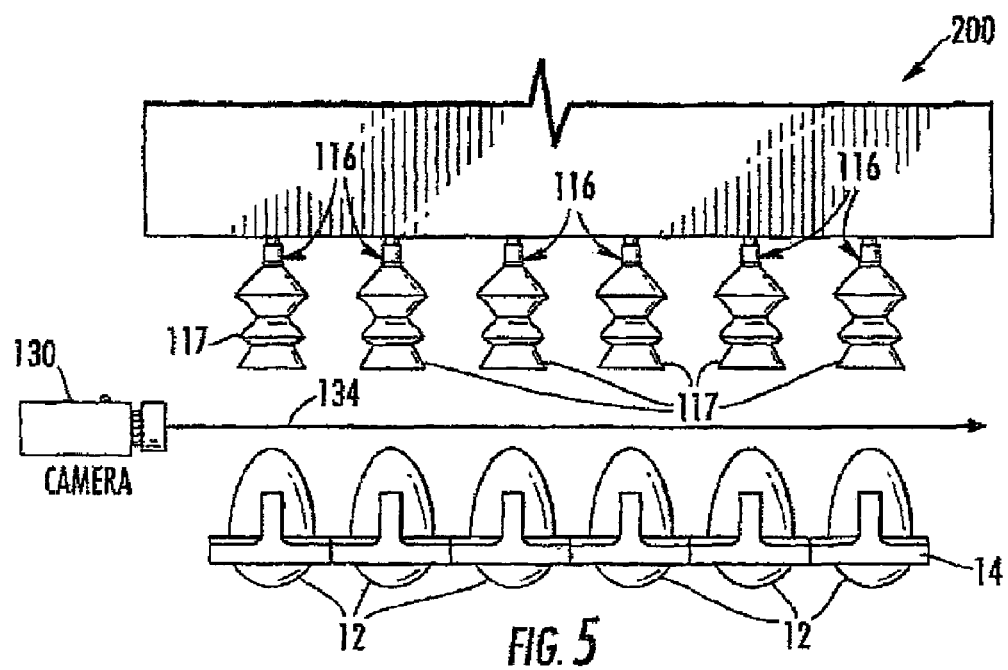
FIGS. 5 and 6 illustrate methods and apparatus for determining if eggs designated for removal from an egg flat have been removed, according to other embodiments of the present invention.
Figure 6:
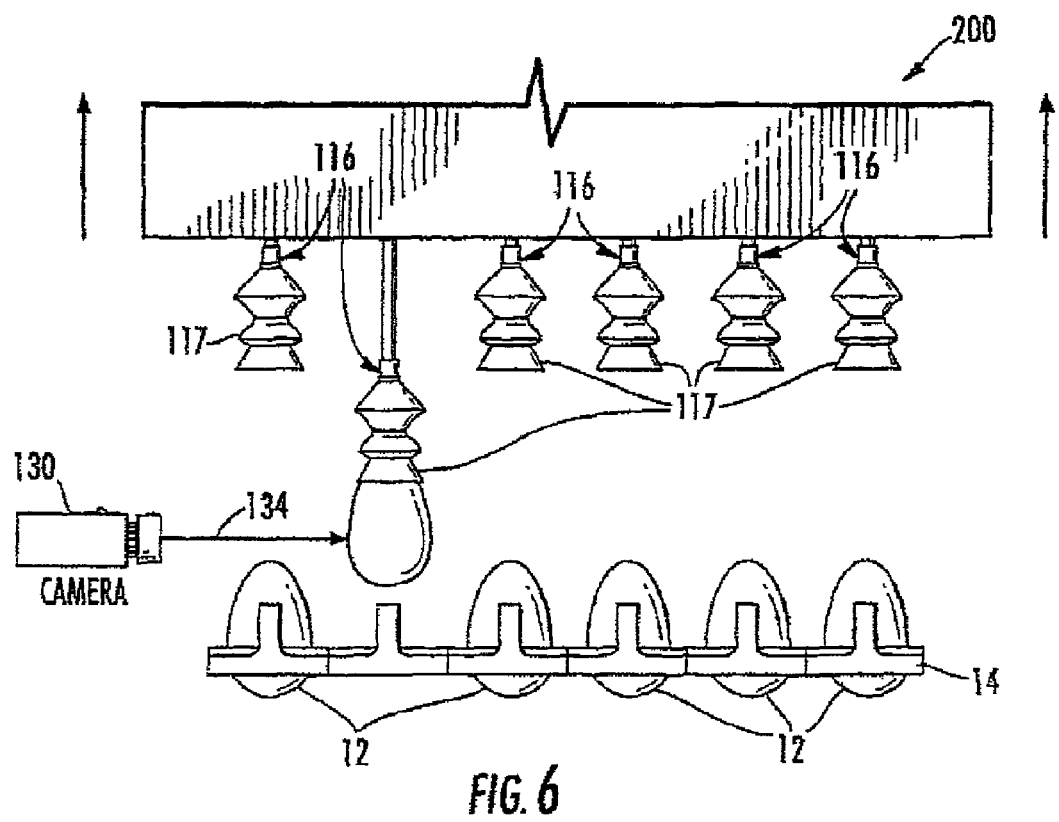
Figure 8:
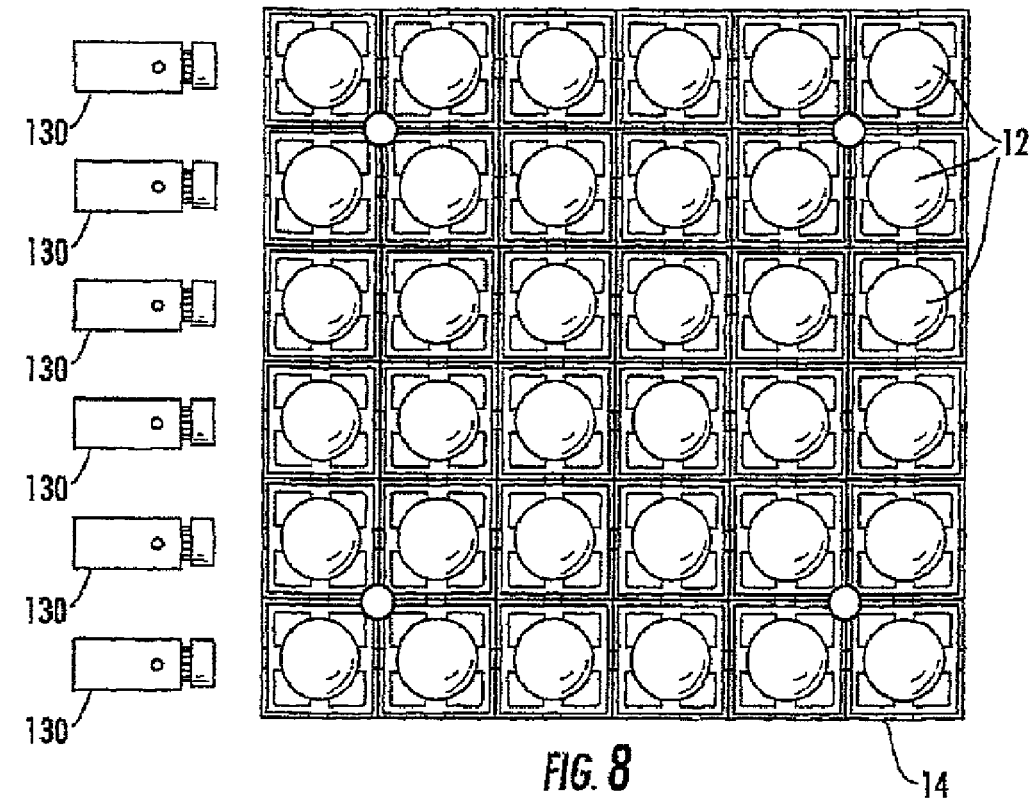
FIG. 8 is a top plan view of an egg flat with a plurality of cameras positioned on one side thereof, in accordance with some embodiments of the present invention.

Referring to FIGS. 5 and 6, methods and apparatus for determining if eggs designated for removal have, in fact, been removed from an egg carrier, according to other embodiments of the present invention are illustrated. Instead of a light source/detector pair for each row of a carrier, the illustrated egg removal apparatus 200 utilizes an optical camera 130 positioned adjacent each row (see FIG. 8). Each camera 130 is positioned on one side of the carrier 14, as illustrated, but does not require a separate detector. Each camera 130 is configured to capture an optical path 134 that extends above and across the carrier. Each camera 130 is configured to measure a length of time that an optical path 134 is blocked when the egg picker 116 is moved from the first location to the second location and back towards the first location.

According to some embodiments of the present invention, each camera 130 is configured to generate a signal that indicates whether or not eggs designated for removal in a row have in fact been removed based on the length of time the optical path 134 is blocked. For example, each camera 130 can generate a signal that indicates that eggs in a respective row designated for removal have been removed from the carrier 14 when the measured length of time that the optical path 134 is blocked is greater than a predetermined length of time. (FIG. 6 illustrates the successful removal of an egg). Similarly, each camera 130 can generate a signal that indicates that one or more eggs designated for removal in a respective row have not been removed from the carrier 14 when the measured length of time that the optical path is blocked is less than a predetermined length of time. Signals generated by each camera 130 may be communicated to a controller for the egg removal apparatus 100, to a user interface, and/or to an alarm, as described above.

Embodiments of the present invention are not limited to the illustrated arrangement of cameras 130. According to other embodiments of the present invention, another set of cameras may also be utilized along the carrier rows that are oriented orthogonal to the carrier rows of FIG. 8 having cameras 130 positioned adjacent thereto. In some embodiments, a camera may be positioned above an egg carrier to confirm that eggs designated for removal have, in fact, been removed.

According to other embodiments of the present invention, the camera 130 of FIGS. 5 and 6 can be replaced with other types of detectors (e.g., reflective detectors, etc.) that are configured to monitor a path above and across an egg carrier and to measure a length of time that the path is blocked when an egg picker is moved from the first location to the second location and back towards the first location. These detectors may also be configured to generate a signal that indicates whether or not an egg has been removed from the carrier based on the length of time the path is blocked.

Figure 9:
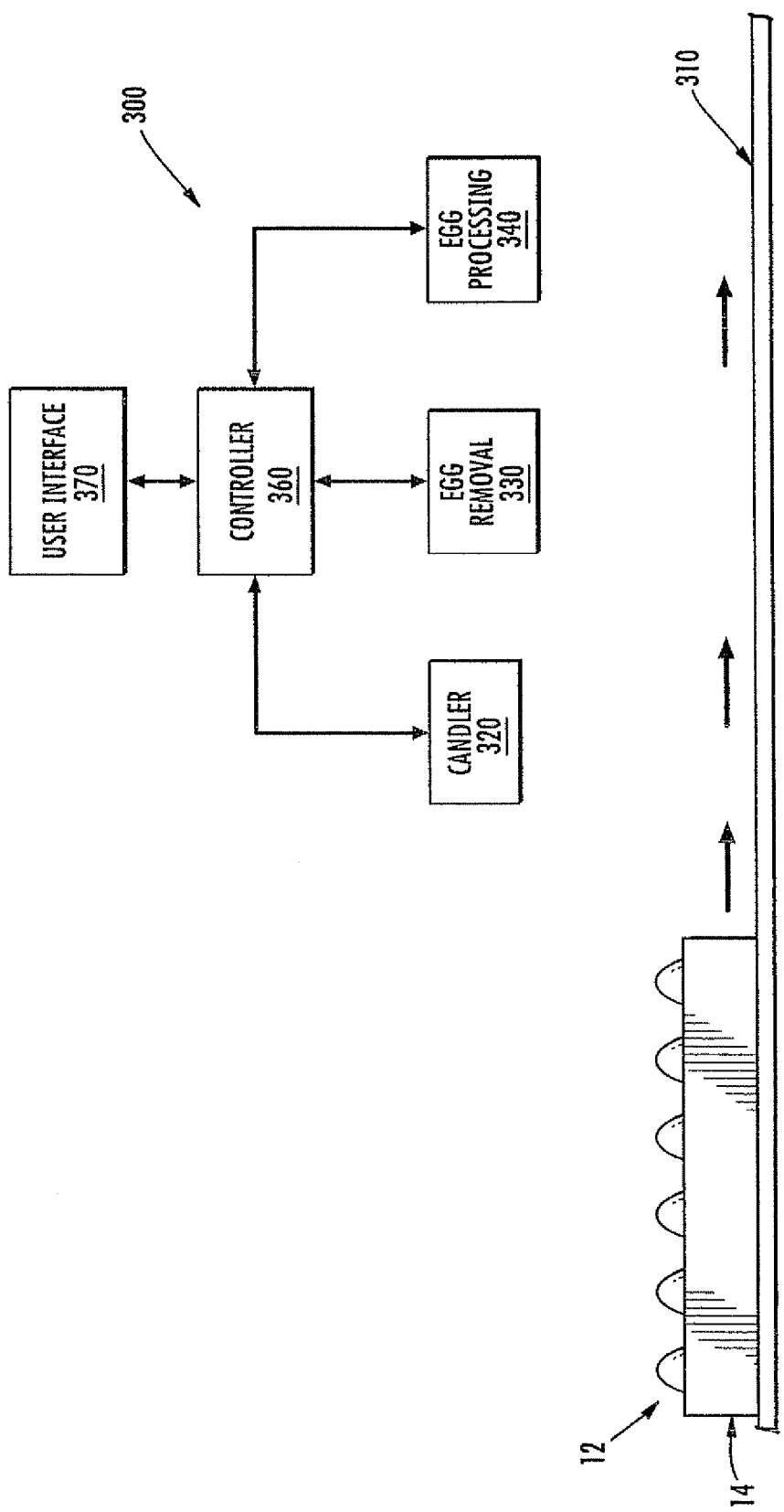
FIG. 9 is a block diagram of an egg processing system, according to some embodiments of the present invention.

Referring to FIG. 9, a block diagram of an egg processing system 300, according to some embodiments of the present invention, is illustrated. The illustrated system 300 includes a conveyor system 310 that conveys flats (or other carriers) 14 of eggs 12, and a candling station 320, operably associated with the conveyor system 310 and with a controller 360, that identifies live/non-live eggs and designates eggs to be removed from a carrier 14. The illustrated system 300 also includes an egg removal station 330 that is configured to selectively remove eggs (e.g., live or non-live eggs, etc.) from an egg carrier 14, and an egg processing station 340. Egg removal station 330 may include egg removal apparatus 100, 200 described above for determining whether or not eggs designated for removal have been removed.

In operation, a flat 14 of eggs 12 is conveyed from an incubator to the candling station 320 via the conveyor system 310. Various types of conveyor systems may be utilized with embodiments of the present invention. Egg conveying systems are well known to those of skill in the art and need not be described further herein. The candling station 320 identifies live eggs and non-live eggs and designates eggs to be removed from the carrier 14.

Eggs designated for removal are removed from the flat 14 via egg removal station 330. Verification of whether or not eggs designated for removal have, in fact, been removed is performed as described above. If one or more eggs are unsuccessfully removed, an operator may be notified and/or another attempt at removal may be undertaken.

Flat 14 at this point on the conveyor 310 proceeds to processing station 340 (e.g., inoculation, vaccine production, material sampling, etc.). An exemplary processing station 340 is the INOVOJECT® automated injection system (Embrex, Inc., Research Triangle Park, N.C.). However, various other processing stations capable of in ovo delivery and/or removal may be used in accordance with some embodiments of the present invention.

The controller 360 controls operations of the candling station 320, the conveyor system 310, the egg removal station 330, and the egg processing station 340. An operator interface (e.g., a display) 370 may be provided to allow an operator to interact with the controller 360. The interface 370 may be configured to display or otherwise indicate eggs that were unsuccessfully removed from the carrier 14.

Embodiments of the present invention are advantageous in that egg pickers that are not working correctly/accurately (i.e., failing to remove eggs designated for removal) can be quickly identified and fixed. The vacuum lines and/or venturis of egg pickers can become plugged with a mixture of egg goo, egg shell dust, and other debris, and when this happens an egg picker will subsequently miss most or all the eggs it tries to remove.

In flu virus harvesting environments, the top of an egg is punched and, as a result, egg pickers may experience more goo and debris than in environments where non-punched eggs are to be removed. Also in the flu vaccine harvesting industry, producers want to reduce the number of workers exposed to the vaccine harvesting environment, particularly for H5N1 viruses (bird flu), so it is important to be able to automatically detect a plugged egg picker and notify an operator so that the egg picker can be cleaned/fixed so that it does not fail to remove eggs from that point on.

Embodiments of the present invention can quickly and accurately identify malfunctioning egg pickers by tracking the number of egg removals each egg picker attempts and the number of unsuccessful egg removals, signaling when unsuccessful egg removals exceed some number per unit time (like more than two failed egg removals in an hour) or failed egg removals exceed some percentage of total egg removals (like failed egg removals are more than 10%, etc.), or a combination thereof. In cases where more than one egg is to be removed from a row and neither is removed, these systems can tally missed picks for both pickers.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

Figure 10:
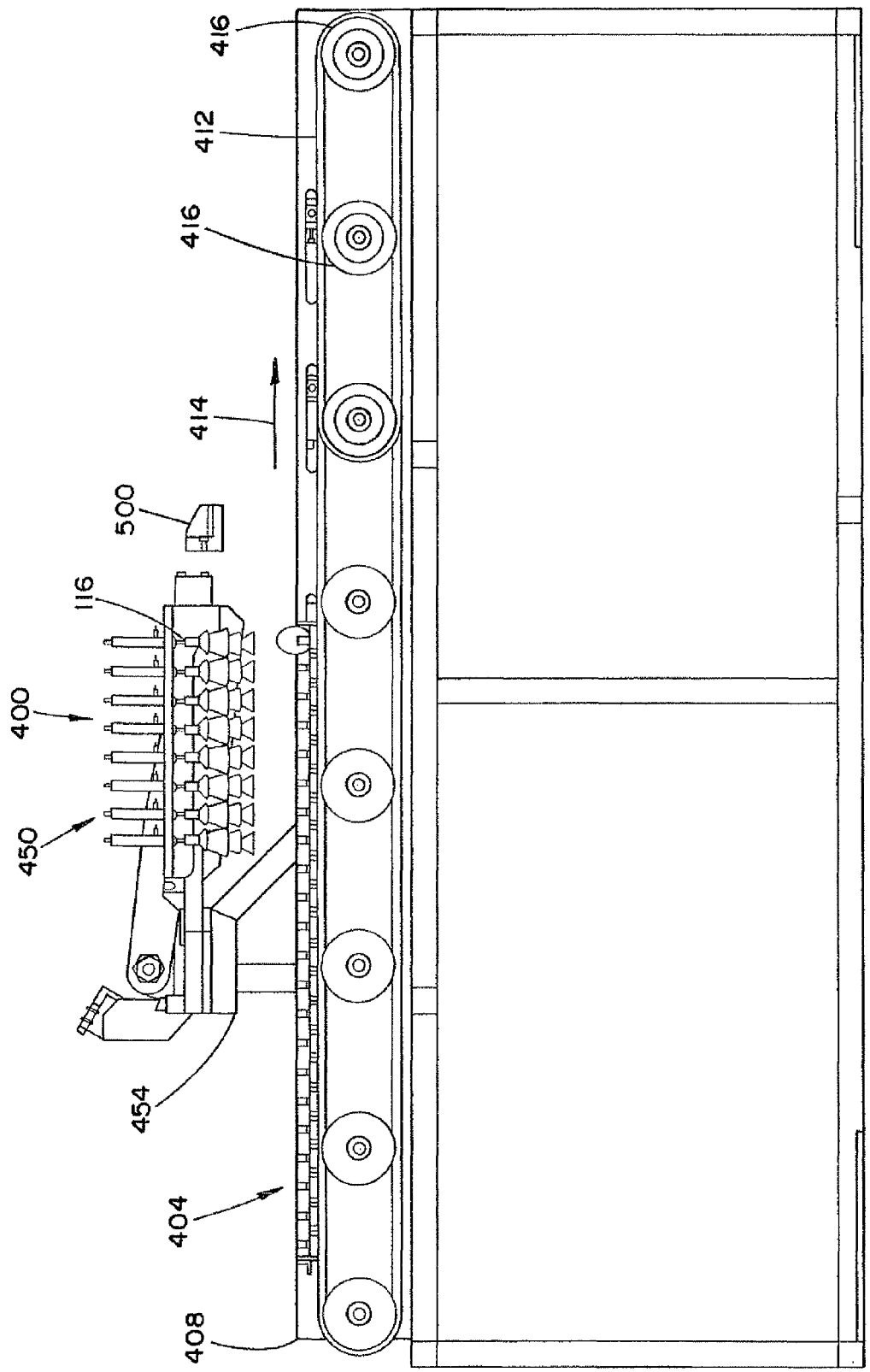
FIG. 10 is a front elevational view of an egg picking apparatus including a detection device according to an embodiment of the invention.
Figure 11:
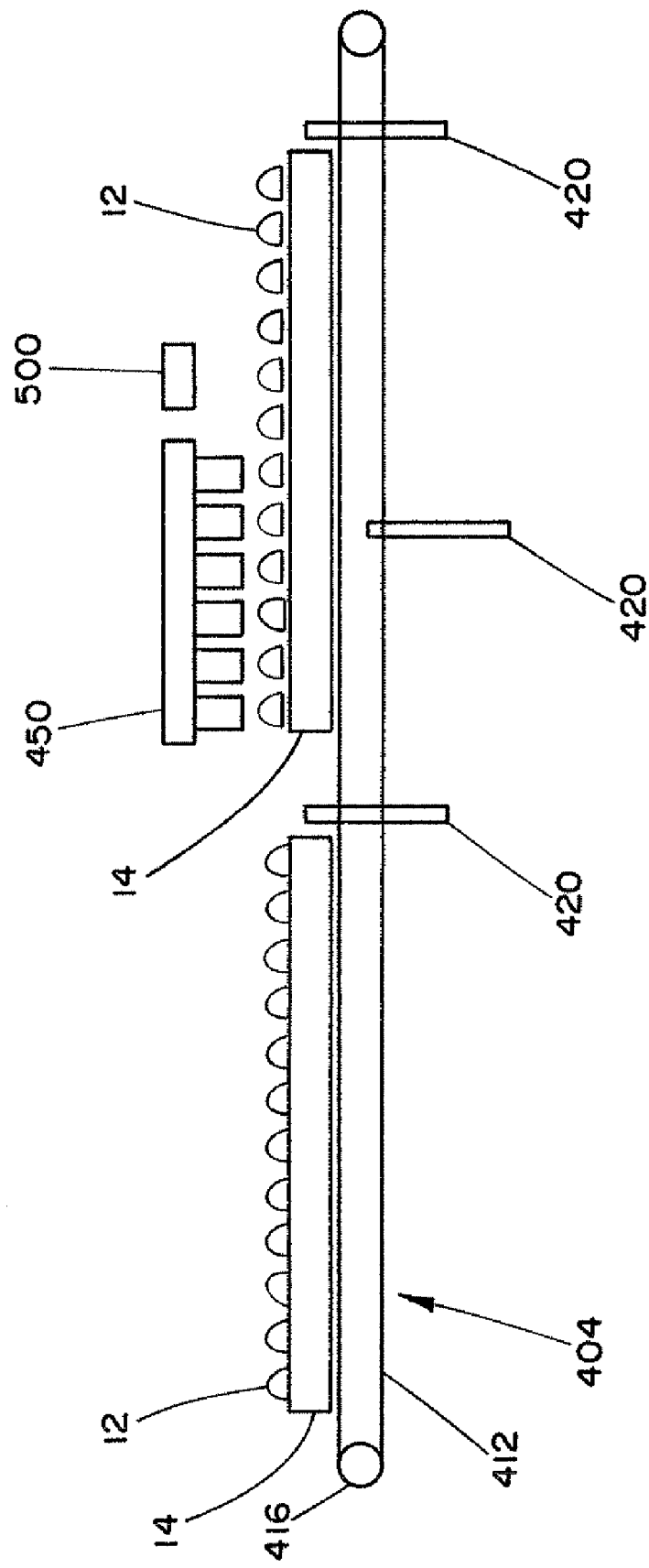
FIG. 11 is a detail view of the egg picker apparatus shown in FIG. 10 including egg flats.
Figure 12:
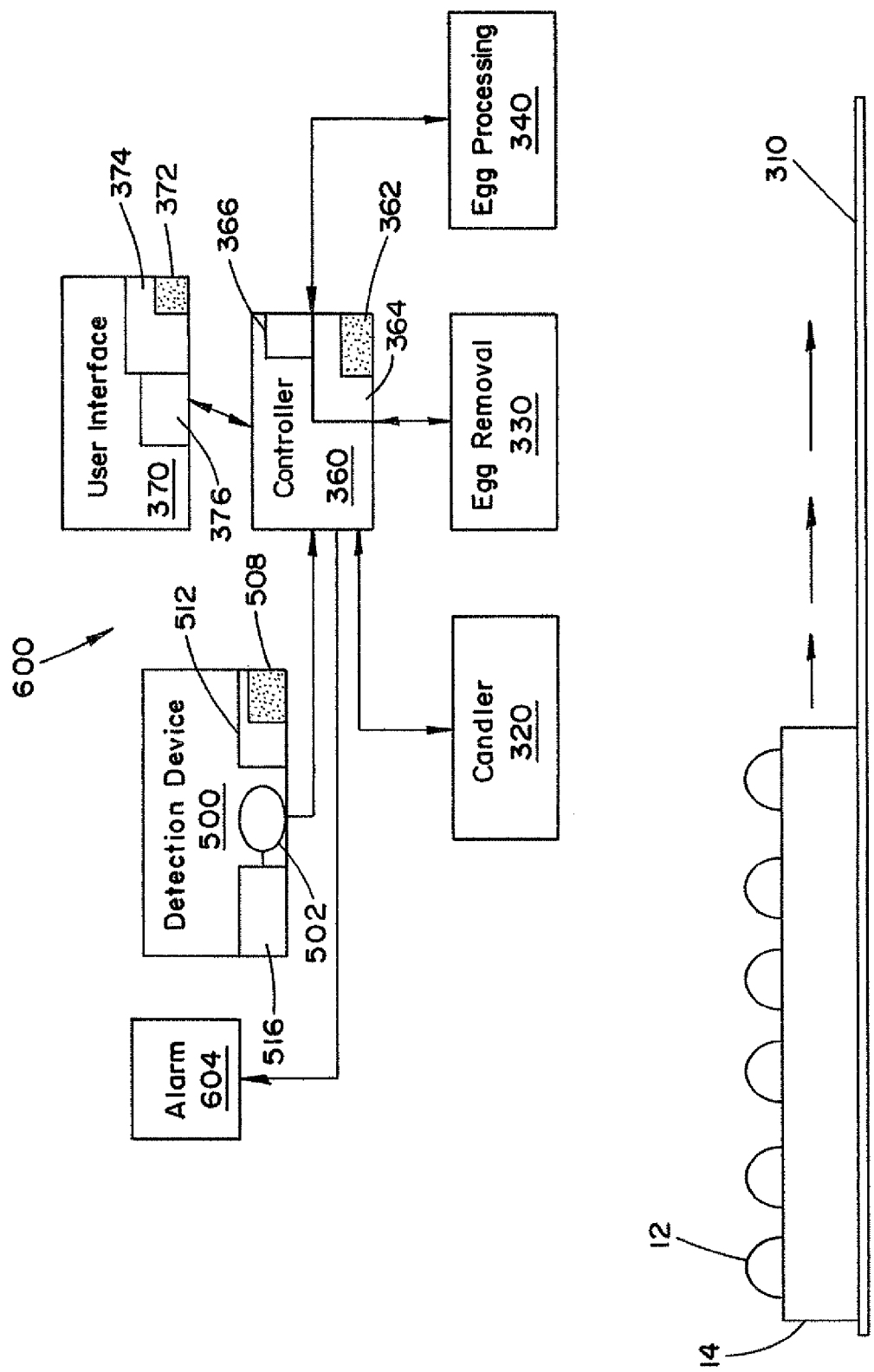
FIG. 12 is a block diagram of an egg processing system according to an embodiment of the present invention employing the detection device of the present invention shown in FIGS. 10 and 11.

Referring to FIGS. 10-12, an embodiment of an apparatus 400 for detecting a malfunctioning egg picker 450 according to the present invention is shown wherein like elements have the same reference numerals as in FIGS. 1-9. The apparatus 400 includes an egg transport apparatus 404 having the egg picker 450 positioned above a movable conveyor system 310 using support members 454. The conveyor system 310 includes a conveyor belt loop 412 positioned over a series of wheels 416. The eggs 12 are transported in flats or egg carriers 14, as shown in FIG. 11, on the conveyor belt 412 to a predefined station under the suction cup egg pickers 116 of the egg picker 450. The egg flat 14 is held in the predefined station by a pin stop 420 which moves between an engaged and disengaged position as shown in FIG. 11. The egg picker 450 then selectively removes one or more eggs 12 from an egg flat as shown in FIGS. 3A-3C, and described in the detailed description. A detection device 500 is positioned above the movable conveyor belt 412 and is attached to the egg transport apparatus 400 using a support structure 504. The detection device 500 is positioned adjacent and downstream from the egg picker 450 in relation to the moving conveyor belt 412 direction 414. The detection device 500 includes an optical system embodied as photodetectors 502. In a preferred embodiment, the photodetectors 502 are waterproof. The detection device 500 further includes a light source for shining diffuse light at the eggs 12 in the egg carrier 14. An alternative embodiment may include a plurality of egg pickers 450 positioned along the conveyor system 310, and one or more detection devices for monitoring the egg picking accuracy of the plurality of egg pickers 450.

In operation, referring to FIGS. 10-12, the egg carrier or flat 14 on the conveyor belt 412 is monitored by the detection device 500 to determine when an egg picker is malfunctioning. As described above in relation to FIGS. 3A-3C, the egg picker 450 moves between a first location and a second location in contacting relationship with the egg in the egg carrier. The egg picker engages a specified egg when in the second location and removes the specified egg from the carrier when moved from the second location towards the first location.

The detection device 500 detects a number of eggs 12 in the egg carrier 14 when the egg carrier 14 passes under the detection device 500 at a specified location adjacent the egg picker 450. The detection device 500 detects the number of eggs 12 in a row in the egg carrier 14 as the egg carrier moves past the detection device 500 at a predetermined rate of speed on the conveyor belt 412.

A control device, embodied as the controller 360, is part of an egg picker verification system 600 (FIG. 12) and electrically communicates with and monitors the egg picker 450. The controller 360 may be a programmable logic controller (PLC) which includes a program 362 embodied in a data storage device 364 and communicates with a processor 366. The light source in the detection device 500 shines diffuse light towards the top of the eggs 12 and the reflected light from the top of the egg 12 causes the detection device to register an "on" signal indicating that an egg is present. The photodetectors 502 electrically communicate with a processor 516 in the detection device 500. The detection device 500 also includes a program 508 embodied on a data storage device 512 communicating with the processor 516 for generating the light source and detection sequence of the detection device 500 according to the instructions of the program 508.

The photodetectors 502 of the detection device 500 are in a row equaling the row width in the egg carrier 14, which is a row of six eggs in a typical flat 14 having a six by six array of egg holders. The egg flats 14 pass beneath the photodetectors 502 of the detection device 500 at a predetermined rate of speed, for example, at about ten inches per second. In one embodiment, the egg flats 14 pass beneath the photodetectors 502 of the detection device 500 at about five inches to nine inches per second. In another embodiment, the egg flats 14 pass beneath the photodetectors 502 of the detection device 500 at about eleven to fifteen inches per second. Flats that hold many eggs (for example, a 132 egg flat having twenty-two rows of eggs with six eggs in each row) may stop as they are picked a segment at a time by a 48 element picking device. The controller 360 receives data from the detection device 500 for calculating the number of eggs 12 in the egg carrier 14. Specifically, the photodetectors 502 detect reflected light from an egg 12 and send the data to the controller 360 using the program 508. When the photodetectors 502 receive reflected light from an egg 12, the controller 360 determines that an egg is in a specific location in the flat 14 using X-Y coordinates. When the photodetectors 502 do not receive reflected light from an egg 12, the controller 360 determines that a specific location in the flat 14 does not have an egg. Thus, the controller 360 calculates a position in the egg carrier 14 for each egg 12 and each empty position in the egg carrier 14. The controller 360 determines when the number of eggs 12 in the egg carrier 14 varies a predetermined amount from a predetermined egg count number for the egg carrier 14 using the program 362. In one embodiment of the invention, the controller calculates when an egg 12 is missing from the flat 14 by using a timing pattern for eggs passing under the detection device. Thereby, when a signal indicating a detected egg is not received for a calculated period of time based on the rate of speed of the conveyor belt, the controller 360 determines that an egg is missing from that row in the flat 14. Missing eggs may be counted by the photodetectors of the detection device sensing a transition from sensing or seeing an egg and flat to seeing a hole where an egg is missing in the flat. For example, a sensing system may be adjusted so that something will always be seen until the large gap of a missing egg occurs, as flats have sufficient material between eggs that no gap between adjacent eggs is seen by a sensor with proper sensor adjustment. The controller 360 generates a signal embodied as an alarm 604 indicating when the number of eggs in the egg carrier 14 varies the predetermined amount from the egg count number. The signal may be embodied as a number of visual and/or audio alerts. The alerts may notify an operator to restart the conveyor system after an automatic shut down occurs when an egg picker has missed a predetermined number of eggs.

After the detection device 500 has detected the number of eggs 12 in the egg carrier 14, the controller 360 correlates the egg carrier 14 to at least one egg picker 450 when the number of eggs 12 in the egg carrier 14 varies the predetermined amount from the egg count number. Additionally, the controller 360 identifies the correlated egg picker using the alarm 604 by, for example, sounding an audible alarm and/or a flashing light, or identifying the egg picker using an identification number. In one embodiment of the invention, the controller 360 generates the alarm 604 when an egg picker 450 has missed a specified number of picks, for example, at least two eggs, or alternatively missing at least two eggs successively, or missing at least two eggs in the same flat, or alternatively, missing three picks in ten attempted picks.

In an alternative embodiment of the present invention, the detection device 500 includes a camera (not shown), and a video processing system (not shown). The egg flat has a predetermined backing color, such as black. The video processing system determines the number of missing eggs 12 in a flat 14 by analyzing whether a black background is viewed using the camera indicating that the location in the flat 14 is empty, or a white object is in the location indicating that an egg 12 is in a specific position in the flat 14. The video processing system communicates the information to the controller 360. Therein, in a similar manner to the embodiment using photodetectors in the detection device 500, the controller correlates the egg carrier 14 to at least one egg picker 450 when the number of eggs 12 in the egg carrier 14 varies the predetermined amount from the egg count number.

In an exemplary embodiment of the invention, a flat 14 has a six by six array of egg positions in the flat 14 on the conveyor system 310. The detection device 500 includes a row of six photodetectors to read one row at a time as the flat 14 passes under the detector device at a preferred speed of ten inches per second. The controller 360 has stored a predetermined egg count number for the egg flat 14 using the program 362 and data storage 364. Thus, the controller 360 has stored the number of eggs 12 that should be in the egg flat 14 and their locations, and conversely, the number and location(s) in the flat 14 which should be missing an egg as the egg was specified to be picked by the egg picker 450. As the flat 14 passes under the six photodetectors 502 of the detector device 500, the photodetectors 502 receive reflected light from any eggs 12 in the row. The program 508 in the detection device 500 determines from the received reflected light in the photodetectors 502 how many eggs are in each row of the passing flat 14 and the locations in the flat 14 missing eggs 12. The controller 360 compares the predetermined egg count number for the egg flat with the number and locations of eggs in the egg flat from the detection device 500. The controller identifies an egg in a location which should be empty and correlates the missed pick to a particular egg picker 450. In another embodiment the controller only records the number of missing eggs and compares this number with the number of attempted picks. The controller 360 can be programmed to initiate an alarm 604 when a predetermined number of eggs are missed by a specific egg picker, for example, two or more picks in a flat. For example, for illustrative purposes, the controller has data which identifies the flat as having one egg 12 picked by the egg picker 450 from each of the six rows of egg locations in the flat 14. Thus, the flat of thirty six egg locations should include thirty eggs, and the eggs should be missing from specific location in each row of the flat 14. The detection device 500, analyzing the eggs using the photodetectors 502, determines that the flat 14 includes thirty three eggs and stores the data of each location in the flat where an egg is missing. The controller 360 identifies the location of the three missed picks, and initiates the alarm 604 as the picker has missed more than two eggs in a flat 14.

The egg picking apparatus 450 shown in FIGS. 10-11 is a high-reliability device for removing non-live eggs from trays or flats 14. However, if foreign materials accumulate in the vacuum passageways of an individual picker or if a pick cup is torn, the picker may fail to pick eggs from the trays. The achieved objective of the egg picker verification system 600 is to detect a malfunctioning picker so that it can be cleaned before it leaves significant numbers of non-live eggs in trays or flats 14. Thereby, the egg picker verification system 600 accomplishes the objective by counting the numbers of eggs missing from each column on a tray 14 and statistically linking this information to individual pickers such as picker 450 shown in FIGS. 10 and 11 which may be one of a multiplicity of pickers. In operation, a picker that fails to pick several eggs will be identified as malfunctioning, and the egg picking system 300 (FIG. 9) and conveyor system 310 (FIG. 10) are halted to clean the malfunctioning picker.

In one example, if an 85% live flock of eggs is presented for processing to the system 600, a single malfunctioning picker of, for example, 48 pickers could increase the percentage of non-live eggs on exiting flats by 0.3% percentage points). The pick verification system 600 identifies a malfunctioning picker so that it can be cleaned before it has failed to pick more than two or three eggs. By cleaning the picker before it fails to pick more than three non-live eggs, the increase in nonlive eggs on exiting trays will be less than 0.06% (percentage points) over one trolley of eggs.

More specifically, an embodiment according to the invention of the picker verification system 600 includes the steps hereinbelow. After, the eggs are candled, the egg tray or flat 14 proceeds to the pick area under picker 450 where the eggs identified as dead are picked out of the tray. For example, a 48 egg picker assembly picks each egg tray in three segments. Downstream of the pick station is the verification area where a line of twelve reflective photodetectors 502 mounted in the detection device 500 above the tray 14 sense or see the top of each egg 12 and the tray 14. Each photodetector monitors the eleven egg positions in each column of a 132 egg tray. A missing egg is detected by a sensor seeing nothing for an interval of time and/or the transition of seeing to not seeing an object. This operation is done sequentially as the tray moves from pinstop 420 to pinstop 420 as tray segments are aligned with an egg picker. The controller 360 (FIG. 12) or PLC tallies the number of missing eggs detected by the sensors 502 in each column and compares the total for each column with the expected number of picks in each column. If there are fewer missing eggs detected in a column than expected picked eggs, this information is sent to the user interface 370 (which may be a human machine interface (HMI)) as a missed pick for that column. This information may be transferred as a boolean mispick, or as the number of mispicks (which is the difference between holes seen and attempted picks) for each column. The interface 370 places a red background over the column with the missed pick. The interface 370, in the present embodiment, may be a panel personal computer (PC) which is typically easier to program than the controller 360 or PLC for numerical operations. Thus, the interface 370 includes an algorithm or program 372 stored in a computer readable medium such as a data storage device 374 and communicates with a processor 376 for executing the program instructions. The interface 370 assigns mispick points, using the algorithm 372 as described below, to all pickers active for that particular column. If the interface 370 tallies multiple missed picks for an individual picker, a picker error will be issued to the controller 360. Then, the controller 360 will halt and issue a halt code for personnel to clean the picker. To restart the system 600 after cleaning the picker, an operator pushes a halt reset button followed by a start button.

In one example of validating picker verification function, a button on a quality control (QC)/diagnostics screen (which may be included in the interface 370) may be called pick sums and shows an array of the accumulation of statistical data by the pick verification system 600. This array shows the current sum for each pick position. When a picker malfunction is detected, the sums array for the suspected picker is reset to a level slightly below the alarm level, for example, after a reset fault button is pushed on a run screen. By resetting to a level just below the alarm level, a continuing picker malfunction will be detected on the next attempted pick by that picker.

In the present embodiment, more than one mispick per picker is required before issuing a halt to prevent random events like a cracked or stuck egg from triggering a halt. For example, in a 90% live flock using a 48 egg picker assembly, the egg picker assembly will average about 480 nonlive eggs per trolley (about thirty six (36) 132 egg flats), and each picker will encounter about ten nonlive eggs per trolley of 4,800 eggs.

Further, when the number of mispicks per column is transferred from the controller 360 to the interface 370. The pick verification algorithm operates by apportioning missed picks to all active pickers in the column with a missed pick. Specifically, if one picker is active in a column and one missed pick is detected then 1.0 is added to the total for this picker. If there are two pickers active for a column and one missed pick is detected then 0.5 is added to the total for each of the pickers. If a column has two missed picks and three attempted picks then ⅔ a point is assigned to each attempted pick. The 132 flat requires three segments be picked per flat, thus it is possible that one plugged picker will cause as many as three missed picks (assuming the same pick position in all three segments contains a nonlive egg and the picker at that position is malfunctioning). In the case where one flat column has two attempted picks by the same picker and one attempted pick by a second picker and there are two missed picks recorded, there would be a total of two mis-pick points assigned, that is, 4/3 of a point to the picker position responsible for two picks and ⅔ of a point to the other active picker. Stated differently, total pick points available for assignment in each column is the difference between the attempted picks and measured eggs missing from that column. Each time a column has no missed picks 0.1 is subtracted from the total for each active picker, for example, a picker that picked twice in the three segments with no mispicks measured for that column would have 0.2 subtracted. Totals are set to zero if the subtraction would create a negative total. Any picker with a total greater than 2.0 is identified as malfunctioning. After any picker halt, all pickers with tallies above 2.0 are set to 1.9 so that operation can continue upon pushing the pick reset button.

In another embodiment, a boolean signal for each column is transferred from the controller 360 to the interface 370. The pick verification algorithm operates by apportioning missed picks to all active pickers in the column with a missed pick. Specifically, if one pick is attempted in a column and a missed pick is detected then 1.0 is added to the total for the active picker. If there are two attempted picks for a column and a missed pick is detected then 0.5 is added to the total for each active picker. If a column has three attempted picks and a missed pick then ⅓ a point is assigned to each active picker. As in the example above, the 132 egg flat requires three segments be picked per flat, thus, it is possible that one plugged picker will cause as many as three missed picks (assuming the same pick position in all three segments contains a nonlive egg and the picker at that position is malfunctioning). In the case where one flat column has two attempted picks by the same picker and one attempted pick by a second picker and a missed pick is detected, ⅔ of a point is added to the picker position responsible for two picks and ⅓ of a point to the other active picker. Each time a column has no missed picks 0.1 is subtracted from the total for each active picker, a picker that picked twice in three segments with no mispicks detected for that column would have 0.2 subtracted from its sum. Totals are set to zero if the subtraction would create a negative total. Any picker with a total greater than 2.0 is identified as malfunctioning. After any picker halt, upon pushing the pick reset button all pickers with tallies above 2.0 are set to 1.9 so that operation can continue.

It is understood that an egg missing as the tray enters the candler has the potential to hide a mispick since the controller 360 is not informed of missing egg information of an entering flat 14. However, the cumulative method of detecting picks will readily detect a malfunctioning picker 450 with or without occasional missing eggs 12 in entering flats 14.

While the present invention has been particularly shown and described with respect to preferred embodiments thereof it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. An apparatus for detecting a malfunctioning egg picker, the apparatus comprising:
a candling device configured to identify eggs for removal from an egg carrier;
an egg picker disposed downstream from the candling device, the egg picker being movable between a first location and a second location in contacting relationship with an egg identified for removal in the egg carrier, the egg picker being configured to engage the egg identified for removal when in the second location and to remove the identified egg from the carrier when moved from the second location towards the first location;
a detection device disposed downstream from the egg picker and configured to detect a supplemental count of eggs in the egg carrier after the egg carrier traverses the egg picker;
a control device in communication with the candling device to determine an initial count of eggs identified by the candling device for removal from the egg carrier, the control device being in communication with and being configured to monitor the egg picker and the detection device, the control device receiving data related to the supplemental count of eggs from the detection device for calculating the number of eggs in the egg carrier after the egg carrier traverses the egg picker, and the control device determining when the supplemental count of eggs in the egg carrier varies a predetermined amount from the initial count of eggs identified by the candling device for removal from the egg carrier.

2. The apparatus of claim 1, wherein the control device generates a signal indicating when the supplemental count of eggs in the egg carrier varies the predetermined amount from the initial count of eggs.

3. The apparatus of claim 1, further including an alarm communicating with the control device and being activated by the generation of the signal.

4. The apparatus of claim 1, wherein the control device correlates the egg carrier to at least one egg picker when the supplemental count of eggs in the egg carrier varies the predetermined amount from the initial count of eggs, and the signal identifies the egg picker.

5. The apparatus of claim 4, wherein the signal indicates the correlated egg picker is malfunctioning.

6. The apparatus of claim 1, wherein the number of eggs in each row or column of the egg carrier is used to determine when the supplemental count of eggs in the egg carrier varies the predetermined amount from the initial count of eggs.

7. The apparatus of claim 1, wherein the detection device includes an optical system for determining the number of eggs in the egg carrier.

8. The apparatus of claim 7, wherein the optical system includes reflective photodetectors.

9. The apparatus of claim 1, further comprising: a moveable conveyor system configured to transport a plurality of egg carriers to the detection device after removal of identified eggs by the egg picker.

10. The apparatus of claim 9, wherein the detection device detects the number of eggs in a row in the egg carrier as the egg carrier traverses the detection device at a predetermined rate of speed.

11. The apparatus of claim 1, wherein the control device calculates a position in the egg carrier for each egg and each empty location in the egg carrier detected by the detection device.

12. The apparatus of claim 1, wherein the initial count of eggs identified by the candling device for removal from the egg carrier is determined by a single candling device.

* * * * *